| United States Patent [19] | [11] 4,132,581 |
|---|---|
| Swartz | [45] Jan. 2, 1979 |

[54] METHOD FOR THE FABRICATION OF PLASTICBOARD

[75] Inventor: Henry D. Swartz, Chestnut Hill, Mass.

[73] Assignee: Standard Oil Company (Indiana), Chicago, Ill.

[21] Appl. No.: 754,504

[22] Filed: Dec. 27, 1976

[51] Int. Cl.² ............................ B31F 1/22; C09J 5/00
[52] U.S. Cl. .................................... 156/208; 156/210; 156/306; 156/282; 156/311; 156/292; 156/322; 264/248; 264/286; 428/182; 428/198
[58] Field of Search ............... 156/208, 292, 210, 306, 156/272, 311, 282, 470, 322, 380; 428/182, 198; 264/248, 286; 219/243; 93/DIG. 1

[56] References Cited

U.S. PATENT DOCUMENTS

| 3,247,041 | 4/1966 | Henderson | 156/272 |
|---|---|---|---|
| 3,367,261 | 2/1968 | Kashiwaga | 219/243 |
| 3,649,432 | 3/1972 | Alexander | 156/210 |
| 3,655,502 | 4/1972 | Yoshikawa | 428/198 |
| 3,811,987 | 5/1974 | Wilkinson et al. | 156/208 |

FOREIGN PATENT DOCUMENTS 2022340  12/1970  Fed. Rep. of Germany ........... 264/286

Primary Examiner—Douglas J. Drummond
Assistant Examiner—J. J. Gallagher
Attorney, Agent, or Firm—Thomas J. Connelly; Arthur G. Gilkes; William T. McClain

[57] ABSTRACT

Method and machine for fabricating plasticboard wherein areas of bonding are created with localized heating and pressure.

9 Claims, 15 Drawing Figures

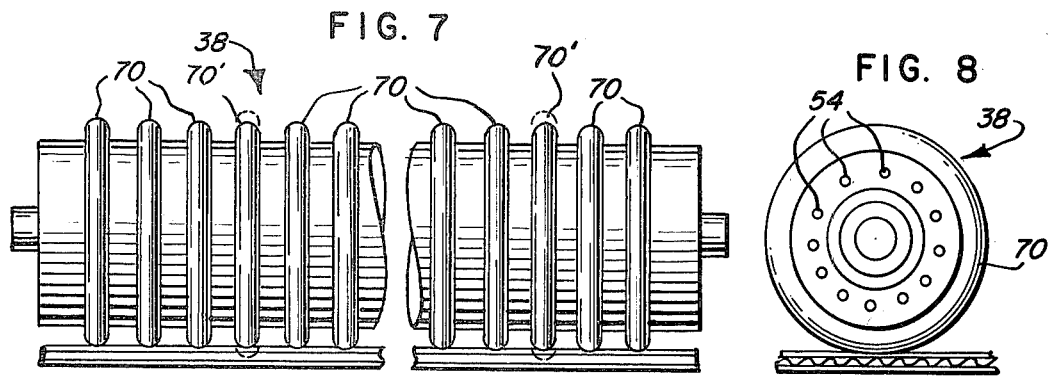
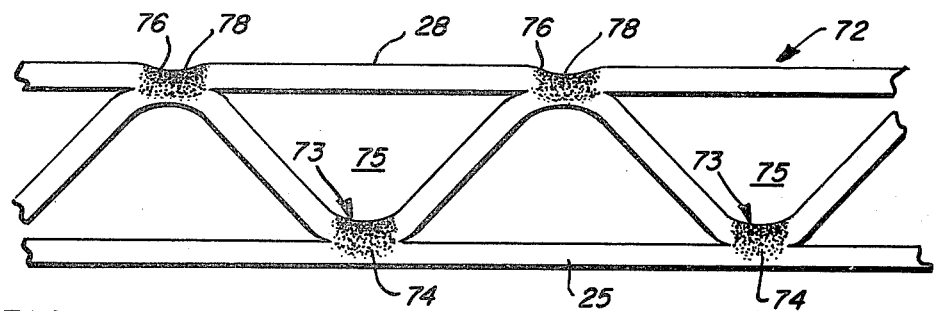
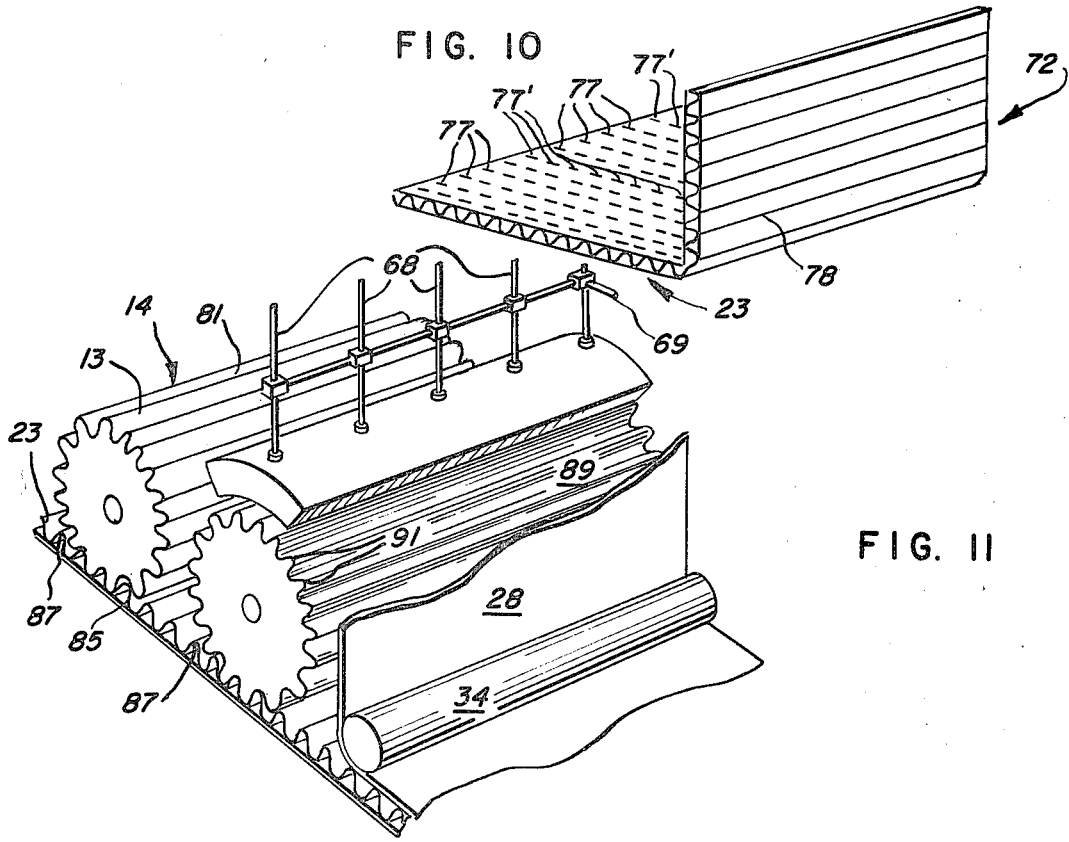

METHOD FOR THE FABRICATION OF PLASTICBOARD

BACKGROUND OF THE INVENTION

1. Field of the Invention

This invention is directed to the art of corrugated plasticboard manufacture. Two faced corrugated plasticboard is an article of manufacture having a sandwich structure wherein two face sheets are heat bonded to and separated by a corrugated core. The materials comprising the core and face sheets can be any material providing a compatible heat fusible or heat sealable surface.

2. Prior Art

Plasticboard having a corrugated core generally is made either by single-piece extrusion using an integral profile die demonstrated by the Covena Company of Italy or by extrusion lamination of two molten plastic films to a corrugated core as disclosed in U.S. Pat. Nos. 3,837,973 (1974); 3,682,736 (1974); and 3,833,440 (1974). In the case of the single-piece extrusion method, the process is limited in that (1) the flutes of the corrugated core run parallel to the extrusion or machine direction, (2) the entire board is of the same material and (3) the process's maximum practical speed is about 17 feet/minute. In the case of the extrusion lamination, the process is limited in that careful annealing is required to avoid warping and/or formation of a wavy surface and in that the process's maximum practical speed is about 40 feet/minute.

BRIEF DESCRIPTION OF THE INVENTION

It is an object of this invention to overcome the limitations inherent in the above cited processes for manufacturing corrugated plasticboard.

It is an object of this invention to provide a method and machine for the fabrication of corrugated plasticboard which has a practical production speed in excess of about 50 feet/minute for both high density polyethylene and polystyrene, in excess of about 60 feet/minute for polypropylene, and in excess of about 50 feet/minute for polyvinyl chloride.

It is an object of this invention to provide a machine for forming a corrugated plasticboard wherein areas of bonding are created with localized heating between a corrugated core and two face sheets which are heat or melt fusible therewith but can be of differing materials.

It is an object of this invention to provide a machine to form a bond or heat seal between two heat fusible sheets while said two sheets are in motion.

It is an object of this invention to utilize localized heating by passage of electric current through a resistance element in the fabrication of corrugated plasticboard.

It is an object of this invention to provide a machine capable of producing heat seals transverse to the direction of corrugation rows of a core on one side of a corrugated plasticboard and heat seals either parallel or transverse to said corrugation rows on the other side.

Other objects of this invention will be clear to a man of average skill in the art based upon this Specification.

One embodiment of this invention is a machine for the fabrication of corrugated plasticboard comprising:

(1) a first means for forming a corrugated web or sheet from a first plastic web, (2) a second means for heating locally to a melt fusion temperature, then cooling until solidified, and throughout conveying said corrugated web or sheet while apexes on a first side of said corrugated web or sheet are in pressure contact with a second plastic web or sheet heat fusible therewith;

(3) a third means for heating a third plastic web or sheet to a melt fusion temperature, and then cooling while conveying said third plastic web or sheet in pressure contact with apexes heat fusible therewith on a second side of said corrugated web or sheet; and (4) a fourth means for synchronizing the speeds: of forming a corrugated web or sheet by said first means, of conveying by said second means and of conveying by said third means.

Said first means is commercially available. Thermoplastic materials such as polystyrene, polyethylene, polypropylene, polyesters, polyvinyl chloride, acrylonitrile/butadiene/styrene resins, and the like, can be formed from flat sheets or webs into an A-, B-, or C-flute corrugated sheet or web.

Said second means includes either an endless conveyor of heating means or a wheel of heating means, or a closed loop of heating means spaced from the surface of either an endless belt of a conveyor or the like so as to create a first nip therebetween. Said heating means are adapted to engage from within the corrugations on a first side of said corrugated web and can be periodicaly energized, as for example, from a voltage source in the case of heating means employing resistance elements. During the period when the heating means are not being energized, they are permitted to cool. As is disclosed in Fener, U.S. Pat. No. 3,015,601 (1962), incorporated by reference herein, it is necessary to maintain pressure upon the heated interface between the heat fusible thermoplastic materials for a short period after the passage of electric current has been discontinued in order to allow the heated region to cool and consolidate or solidify under pressure. The resistance element can be made from a high resistance alloy such as nichrome with a resistance of about 1.3 ohms/foot. The voltage can be generated by a voltage source producing either an alternating or direct current. The voltage is in the range of about 50 to 80 volts. The duration of the specifically applied voltage is set so as to generate in each of the abutting plastic webs at the interface melt fusion temperatures in the range of 300°–625° F. for high density polyethylene, 325°–625° F. for polypropylene, 300°–625° F. for polystyrene, and 400°–650° F. for polyvinyl chloride. The duration and voltage of the pulse as known by the art is a function of: temperature; total thickness, which is in the range of about 10–50 mils and which is the sum of the thicknesses of the corrugated core and both plastic facing sheets; and the pressure, which is in the range of about 10–50 psi and which optionally can be initially applied during heating but is necessarily maintained during the cooling and solidifying phase.

Said third means includes a plurality of temperature controllable rolls comprising at least one heated roll and at least one chill roll spaced from the surface of either an endless belt of a conveyor or the like so as to create a second and third nip, respectively, therebetween. The distance between said second and third nips is set so that for a given speed of the web and temperature of said at least one heated roll, the web does not solidify at the interface between said second plastic sheet and said apexes on a second side of said corrugated web or sheet until pressure is applied by said chill roll.

An alternative third means includes either a means for extruding a molten web into contact with melt fusible apexes of a second side of said corrugated web or means for heating such as radiant heating, a plastic web before and/or after contacting apexes melt fusible therewith.

Another embodiment of this invention is a machine for manufacturing corrugated plasticboard which comprises:

(1) an unwind station capable of supplying a first, second and third web of heat fusible thermoplastic material, (2) a means for forming a corrugated thermoplastic web from said first web, (3) a first heat sealing station comprising:

(a) a closed loop of periodically activatable means for heating adapted to engage said corrugated thermoplastic web;

(b) a first conveyor which is spaced from said closed loop so as to create a first nip therebetween;

(c) a means for synchronizing at a selected linear speed in the machine direction said closed loop and said first conveyor;

(d) a means for orienting in said first nip said second web and said corrugated thermoplastic web, wherein a first side of said second web is in contact with apexes on a first side of said corrugated thermoplastic web and a second side of said second web is in contact with a portion of said first conveyor, and a second side of said corrugated thermoplastic web is engaged by a portion of said closed loop; and (4) a second heat sealing station comprising alternately, one of the following: either, (a) a means for heating a third web before and/or after contacting under pressure a first side of said third web with apexes on a second side of said corrugated thermoplastic sheet, and (b) a means for synchronizing the speed in the machine direction through said first and said second heat sealing stations; or, (a) at least one heated roll;

(b) at least one chill roll;

(c) a conveyor; wherein said at least one heated and said at least one chill roll are spaced from said conveyor so as to create a second and third nip, respectively, therebetween;

(d) a means for synchronizing speeds of said at least one heated roll, said at least one chill roll, and said conveyor; and (e) a means for orienting, in said second nip and in said third nip, said third web and said corrugated thermoplastic sheet, wherein a first side of said third web is in contact with apexes on a second side of said corrugated thermoplastic sheet and a second side of said third web is in contact with said at least one heated roll and said at least one chill roll, respectively.

The heated roll and/or chill roll can have either a hard or a resilient surface depending upon the nature of the heat fusible thermoplastic material used. In the case of a heat fusible polycarbonate, a non-resilient or hard surface is preferred, but in the case of heat fusible polyvinyl chloride, a resilient surface is preferred.

The chill roll can be cooled either by a stream of cold air passing over its surface or the circulation of a cooling fluid through interior channels, as is readily understood in the art.

Another embodiment of this invention is a machine for manufacturing corrugated plasticboard which comprises:

(a) an unwind station capable of supplying three plastic webs;

(b) a corrugation station capable of forming a corrugated web from a first of said three plastic webs;

(c) a first heat sealing station comprising:

(1) a closed loop of a first set and a second set of substantially alternating separately activatable heating means adapted to engage a first side of said corrugated web, wherein said first set is adapted to extend into corrugations of said first side of said corrugated web;

(2) means for separately activating said first and said second sets of separately activatable heating means;

(3) a first conveyor spaced from some of said first set of heating elements to create a first nip therebetween; and (4) means for orienting in said first nip a second of said three plastic webs and said corrugated web, wherein a first side of said second of said three plastic webs is in contact with corrugations on a second side of said corrugated web, a second side of said second of said three plastic webs is in contact with said first conveyor and said first side of said corrugated web is engaged by a portion of said closed loop of heating means;

(d) a second heat sealing station comprising:

(1) at least one temperature controllable roll;

(2) a second conveyor spaced from said roll so as to create a second nip therebetween;

(3) a means for orienting a third web of said three plastic webs and said corrugated web in said second nip; wherein said third web of said three plastic webs is in pressure contact with corrugations on said first side of said corrugated web; and (4) a means for synchronizing the speed in the machine direction of said corrugated web as it exits from said corrugation station and as it is moved through said first and second heat sealing stations.

It is to be noted that instead of two conveyors corresponding to said first and said second conveyors, one conveyor can be arranged to function in both said first and said second heat sealing stations.

One embodiment of a method of this invention for manufacturing a single faced corrugated plasticboard comprises:

(1) forming a corrugated web, (2) heating selectively apexes from within corrugations of said corrugated web, (3) cooling under pressure a first web in contact with and compatibly heat fusible with said apexes on a first side of said corrugated web; wherein said first web and said corrugated web are in continuous motion throughout steps (1) to (3).

Said corrugated web is melt fusible to said first web. Each web is heated to a temperature at the interface in the range of about 300°–625° F. for high density polyethylene, 325°–625° F. for polypropylene, and 400°–650° F. for polyvinyl chloride, and the plastic is cooled until solidified from said temperatures while under a pressure for the above materials in the range of about 5–100 psi. Other materials can be used provided that they are compatibly heat fusible. Higher temperatures and pressures can be applied depending upon the thermoplastic materials employed, as for example in the case of polycarbonates. The maximum pressure is primarily dictated by the crush strength of the corrugated core and/or the resulting puncturing of a face sheet under too much heat and pressure, as is recognized by a man of skill in the art.

In another embodiment, a method for manufacturing a two faced corrugated plasticboard comprises:

(1) forming a corrugated web, (2) heating selectively apexes of a first side from within corrugations of said corrugated web, (3) solidifying under pressure a first web in contact with and compatibly heat fusible to said apexes on said first side of said corrugated web, (4) heating a first side of a second web, (5) contacting a second side of said second web and apexes on a second side of said corrugated web, (6) solidifying under pressure said second web in contact with said corrugated web; wherein all webs are in continuous motion during steps (1) to (6).

It is to be noted that some of the heating of step (2) is preferably done while apexes on a first side of said corrugated web are in pressure contact with said second side of said first web.

It is also to be noted that the order of steps (4) and (5) can partially or wholly overlap. Preferably, the heating of step (4) is occurring at some time while said second web is in pressure contact with said apexes on a second side of said corrugated web.

In still another embodiment, a method for manufacturing a single faced corrugated plasticboard comprises:

(1) contacting a first web with apexes compatibly heat fusible therewith which apexes are on a first side of a corrugated web, (2) heating selectively said apexes from within corrugations of said corrugated web, (3) solidifying under pressure said first web in contact with said apexes; wherein all webs are in continuous motion throughout steps (1) to (3).

It is to be noted that preferably pressure can be applied during the step of heating selectively, and that steps (1) and (2), and (2) and (3) can occur in partially overlapping sequence.

In still another embodiment, a method for manufacturing a two faced corrugated plasticboard comprises:

(1) contacting a first web with a first set of apexes compatibly heat fusible thereto which apexes are on a first side of a corrugated web;

(2) heating selectively said first set of apexes from within;

(3) solidifying said first set of apexes in pressure contact with said first web to form a bond therebetween;

(4) heating from without a second set of apexes on a second side of said corrugated web, wherein the step of heating said second set of apexes is preferably partially simultaneous with the step of solidifying said first set of apexes;

(5) contacting under pressure said second set of apexes with a first side of a second web heat fusible thereto; optionally there can be either additional heating of said first side of said second web prior to contacting under pressure said second set of apexes and/or additional heating of a second side of said second web subsequent to said contacting under pressure said second set of apexes; and (6) solidifying said second set of apexes in pressure contact with said second web to form a bond therebetween.

DETAILED DESCRIPTION OF THE INVENTION

FIG. 7 is a front view of a machine element which can be substituted for a corresponding machine element of FIG. 5.

FIG. 8 is a side view of the machine element of FIG. 7.

FIG. 9 is a heat sealed plasticboard wherein there are heat seals produced by the machine of FIG. 1.

FIG. 10 is a isometric view of a heat sealed plasticboard produced by the machine of FIG. 1 and subsequently folded.

FIG. 11 is an alternative embodiment of the first continuous heat sealing station of FIG. 1.

Figure 1:
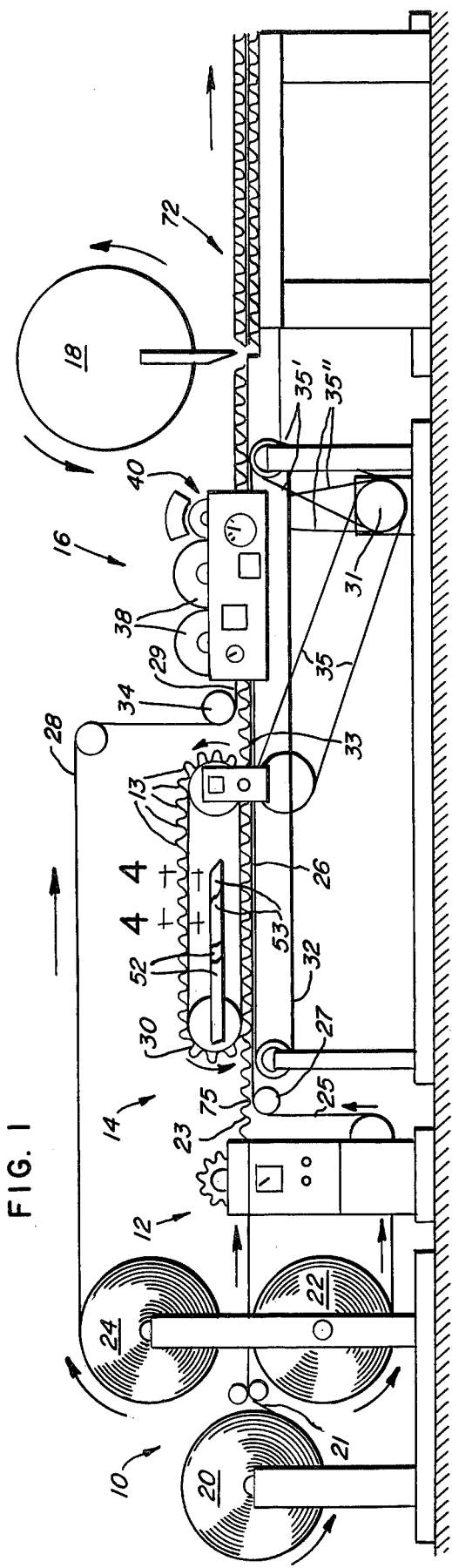
FIG. 1 is a schematic of a machine to produce corrugated plasticboard which employs localized heating at a first heating station to produce a laminate between a first side of a corrugated core and a first plastic sheet melt fusible thereto and a second heat sealing station to form a laminate between a second side of said corrugated core and a second plastic sheet heat fusible thereto.

In FIG. 1, there is an unwind station 10, a corrugation forming station 12, a first continuous heat sealing station 14, a second continuous heat sealing station 16, and a flying knife or cutting means 18. Station 10 comprises three rolls 20, 22 and 24 each carrying heat or melt fusible plastic material. Station 12 is a commercially available corrugation forming station. Station 14 comprises a closed loop 30 of heating means 13, a first conveyor 32, pairs of bus bars 52 and 53 (see FIGS. 2 and 3), and a common drive 31 with belts 35, 35', and 34". Second heat sealing station 16 comprises a plurality of temperature controllable rolls 38 and 40, an extension of conveyor 32 and belts 35' and 35" of common drive 31.

Unwind station 10 is the source for three plastic webs. These webs are a core forming medium 21, a first face material 25, and second face material 28.

Station 12 is a commercially available corrugation forming station containing matched chrome plates rolls with infinitely variable speed drive and multiple zone temperature controls. Standard A-, B-, and C-flutes, which are 36 ± 3 flutes/lineal foot of approximately 3/16 inch in height, 50 ± 3 flutes/lineal foot of approximately 3/32 inch in height, and 42 ± 3 flutes/lineal foot of approximately 9/64 inch in height, respectively, and which have thicknesses in the range of about 0.004 to about 0.025 of an inch can be formed at station 12.

Figure 2:
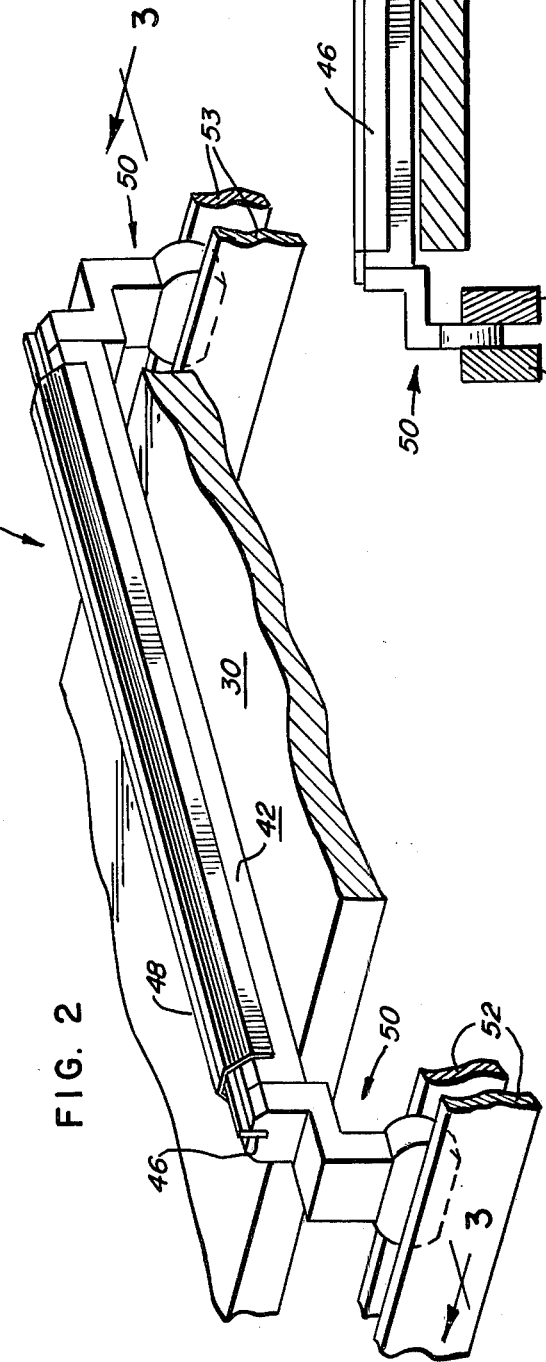
FIG. 2 is an enlarged isometric view of a single heating means of FIG. 1.
Figure 3:
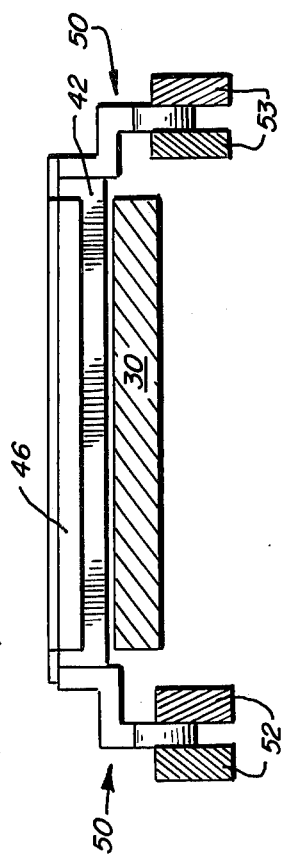
FIG. 3 is a cross-sectional view along line 3—3 of FIG. 2.

In continuous heat sealing station 14, a closed loop or conveyor 30 of heating means 13 is spaced from a first conveyor 32 so as to create a first nip therebetween. Some of the legs 50 of heating means 13 of conveyor 30 are in pressure contact with pairs of bus bars 52 and 53 as shown in FIGS. 2 and 3. Bus bars 52 and 53 are in contact with a voltage source (not shown).

Common drive 31 is connected by drive belts 35, 35′, and 35″ to conveyor 30, first conveyor 32, and chill roll 40.

Figure 6:
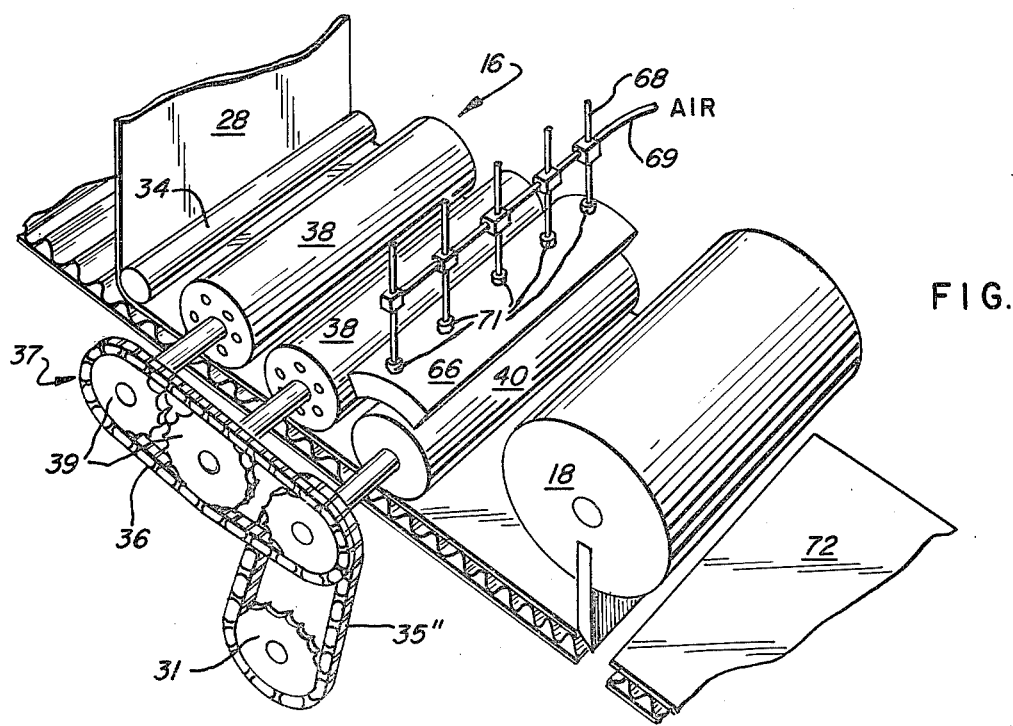
FIG. 6 is an isometric view of the second continuous heat sealing station of FIG. 5.

In continuous heat sealing station 16, temperature controllable rolls 38 and 40 are spaced from conveyor 32 so as to create a second and third nip, respectively, therebetween. It is to be noted that a plurality of heated rolls 38 or chill rolls 40 can be used, and that throughout this Specification and Claims, said second nip refers to those nips between heated rolls 38 and conveyor 32, and said third nip refers to those nips between rolls 40 and conveyor 32. It is clear that conveyor 32 functions as part of both heat sealing stations 14 and 16. However, there can be a separate conveyor 32 for each station. Common drive 31 is connected by a belt 35″ to chill roll 40 (see FIG. 6). Temperature controllable rolls 38 and 40 through cogged wheels 39 are connected by a drive chain 36 as shown in FIG. 6.

Flying knife 18 is a commercially available means for cutting corrugated plasticboard into desired lengths.

To understand the operation of the machine in FIG. 1, the step-by-step process by which a heat sealed plasticboard is formed in described hereinafter. A core forming medium 21 is unrolled from source roll 20 to a corrugation forming station 12. Core forming medium 21 having been formed into a corrugated core sheet 23 is brought into a pressure contact with a first face material 25 which is unrolled from roll 22. An orienting means such as roll 27 guides first face material 25 into contact with corrugated core material 23 in the first nip between conveyors 30 and 32. Conveyor 32 acts as a drive means to maintain material 25 both in motion and in pressure contact with corrugated core 23. Conveyor 30, comprising a plurality of heaters or heating means, 13 engages the corrugations of core material 23 in spaces 75 (see FIGS. 9 and 14) and maintains core material 23 in continuous motion with first face material 25. The speed of conveyors 30 and 32 are synchronized by means of a belt 35 connected to an infinitely variable common drive 31. The conveyors are synchronized to the speed at which core material 23 is formed at corrugation stations 12. While heaters 13 are in contact with bus bars 52 and 53, a constant voltage from a source (not shown) forces current to flow through a resistance element 46 (see FIG. 2) thereby causing resistive heating. Since bus bars 52 and 53 beginning at the upstream end do not extend for the complete length of conveyor 30, there is a period of cooling which occurs while heaters 13 are not in contact with bus bars 52 and 53. Heaters 13, in addition to engaging apexes of core material 23, heat by means of resistive heating the inside wall 73 (see FIG. 9) of these apexes. The heat generated at an apex of core material 23 passes through the core material and into a portion of a first face material 25. Since a pressure contact is maintained throughout the length of conveyor 30 between the core medium 23 and first face material 25, a heat seal is produced therebetween. Laminate 33, comprising core medium 23 heat sealed to first face material 26′, emerges from the continuous heat sealing station 14 wherein a second face material 28 from a source roll 24 is brought into contact with laminate 33 around an orienting means such as roll 34 in or just before the second nip between a heated roll 38 and conveyor 32. Laminate 33 enters heat sealing station 16 which comprises a plurality of heated rolls 38 and a chill roll 40. Heated rolls 38 and chill roll 40 will be discussed in more detail with reference to FIG. 6. As a first side of a second face material 28 is brought by orienting means 34 into contact with laminate 33 in or just before said second nip, heat and pressure from rolls 38 are applied to a second side 29 of said material 28. It is to be noted that a plurality of chill rolls 40 can be used. If a plurality of heated rolls 38 are used, they are kept as close together as practical and set at increasing temperatures so that the temperature of the plastic can be increased gradually to its melt fusion temperature. Following rolls 38, a cooled roll 40 is used, which provides a means for rapidly cooling and solidifying the plastic and thereby increasing production rates as well as ensuring bond formation. The temperature of roll 40 can be controlled in a variety of ways one of which is discussed in relation to FIGS. 5 and 6. As finished plasticboard exists from station 16 it is cut into desired lengths 72 by means of a flying knife 18.

Figure 4:
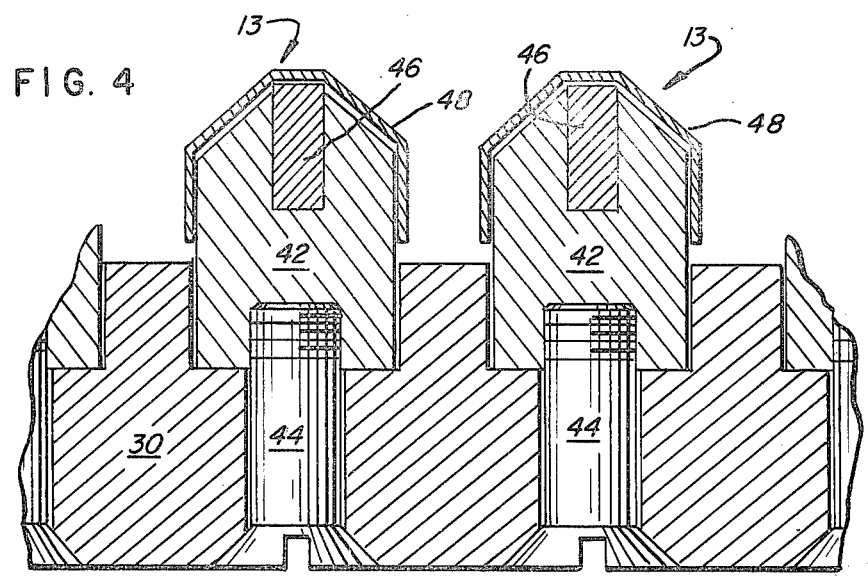
FIG. 4 is an enlarged cross-section along 4—4 of FIG. 1.

FIG. 2 is an enlarged isometric view of a single heater 13 of FIG. 1. Heating means 13 comprises: a non-conducting base support 42 attached to conveyor 30 by a screw or other attaching means 44 as shown in FIG. 4; a resistance element 46 covered by a Teflon (polytetrafluoroethylene) coated glass cloth 48 which acts as a release layer and contact legs 50. Contact legs 50 are brought into pressure contact with bus bars 52 and 53. Bus bars 52 and 53 are under a compression spring-like device (not shown) so as to maintain a pressure contact on either side of contact legs 50. In the preferred embodiment, a source of voltage (not shown) is applied without interruption to bus bars 52 and 53 so that a potential difference is generated across resistance element 46. In general, the voltage applied to bus bars 52 and 53 can be either AC or DC and can be applied either continuously or with interruptions. Bus bars 52 and 53 can extend across the full length of the conveyor 30 so as to maintain uninterrupted contact with legs 50, however, in the preferred embodiment such contact with legs 50 is interrupted. Current is forced through resistance elements 46 to generate heat but then is stopped either by breaking off electrical contact between contact legs 50 and bus bars 52 and 53 as in the preferred embodiment or by interrupting the power input (not shown) to bus bars 52 and 53. A stopping of power to resistance elements 46 permits the resistance elements 46 and any plastic in contact therewith to cool.

FIG. 3 is a cross-sectional view of FIG. 2 along line 3—3. Bus bars 52 and 53 are arranged in pairs on either side and in pressure contact with contact legs 50 by means of a spring means (not shown).

FIG. 4 is an enlarged cross-sectional and partial view of heaters 13 which comprise a non-conductive base 42 to which is attached a resistance heating element 46 covered by a Teflon coated glass cloth 48. The heaters are attached to conveyor 30 by means of screws 44.

Figure 5:
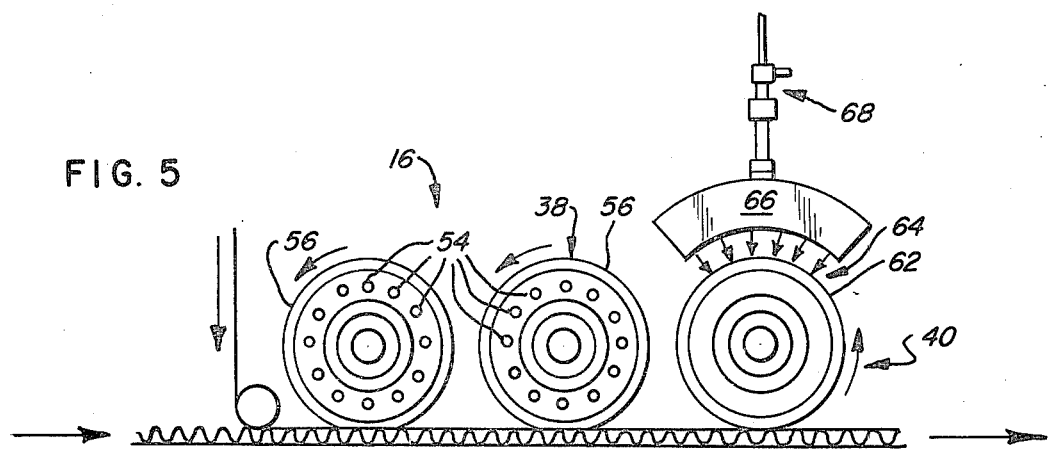
FIG. 5 is an enlarged side view of the second continuous heat sealing station of FIG. 1.

In FIG. 5, heat from the heating channels 54 is transferred throughout each roll 38 and to surfaces thereof which are covered by a thermally conductive and resilient material 56 such as silicone rubber. The thermally conductive and resilient material 56 aids in distributing both heat and pressure. Cooled roll 40 is a thermally conductive drum having a resilient surface 62 of a material such as silicone rubber to which is applied a stream of cool air 64. Cool air 64 is distributed by means of a hood 66 attached to a source of cool air (not shown). Cool air 64 can be supplied from a vortex tube 68. Tube 68 can be a means of taking air under pressure and producing therefrom a cool stream and a hot stream. Here the cool stream 64 is applied to the surface 62 of roll 40. Another form of roll 40 is that of roll 38 except that a cooled fluid rather than a heated fluid is circulated through channels 54. The distance between a roll 38 and a roll 40 is such as not to permit any significant exchange of heat therebetween but close enough to ensure that the plastic has not solidified before chill roll 40 has applied pressure, i.e., in keeping with the teachings of Fener U.S. Pat. No. (3,015,601 (1962)).

FIG. 6 is an enlarged isometric view of continuous heat sealing station 16, comprising two heated rolls 38, a chill roll 40, a hood 66, tubes 68 in series, a drive means 37, a drive belt 35", chain 36, common drive 31, and flying knife 18. All temperature controllable rolls 38 and 40 are attached together by a means 37 comprising a chain 36 which interacts with cogged wheels 39. These rolls are suspended from a frame (not shown) by means of which the pressure at the nip created between these rolls and conveyor 32 (not shown) can be controlled. A source of compressed air (not shown) is supplied to a series of connected tubes 68 through an inlet 69. The cold air stream formed by tubes 68 is directed from cold stream take-offs 71 into hood 66. Hood 66 distributes air from cold stream take off to the outside resilient surface of chill roll 40. Common drive 31 by means of belt 35" turns chill roll 40 at a rate synchronized to the speed of conveyor 32 (see FIG. 1). Drive chain 36 interacting with cogged wheels 39 maintains uniform rotation rates between all temperature controllable rolls 38 and 40. As finished plasticboard exits from second continuous heat sealing station 16 it is cut into desired lengths 72 by an independently controllable flying knife 18.

In FIGS. 7 and 8, an alternate form of heating roll 38 is disclosed wherein a series of either hard or resilient projections 70 and 70' are spaced around heated roll 38 so as to apply pressure in localized areas, thereby forming the heat seals between second face 28 and laminate 33 in particular areas 77 and 77', respectively, which are transverse to rows of corrugations 76 of core 23 as shown in FIG. 10. It is to be noted that phantom projections 70' exemplify a means to produce an embodiment, wherein some of the seals 77' (see FIG. 10) are at such a depth across the corrugated core that a smooth or clean fold comprising some of said seals 77' will form under a simple bending or flexing without the need to employ a pressure assist bar. A pressure assist bar is generally a blunted knife edge or a narrow flat edge of from about 1/32" to about 1/16" along which a sufficient pressure (usually of from about 2-5 psi) is applied to partially crush a portion of a corrugated core in a localized area. When a flexing or bending force is applied to the plasticboard about the pressure assist bar, a clean or smooth fold is achieved in said localized area.

In FIGS. 9 and 10, an enlarged side elevation view of a finished plasticboard 72 and a perspective view of a folded plasticboard 72, respectively, are disclosed which can be made by the machine of FIG. 1. Two different types of seals are disclosed. The first type of seal 74 is made in station 14 by heating the upper inside wall 73 of apexes of core 23 from within space 75 by means of heaters 13 which are carried by conveyor 30, and the second type of seal 76 is made in heating station 16. The array of dots at 78 and 74 indicate as is common in the art both the location and direction from which heat is applied to produce a heat seal. Variations in the intensity of heat generated at a particular location are represented by variations in density of dots; i.e., the more heat, the more dense the dots. Two different types of seal 76 are possible depending upon whether the heating roll 38 of FIG. 6 or FIG. 7 is used. If heating roll 38 having a uniform circular circumference as shown in FIG. 6 is used then a heat seal such as 78 across the full width of core 23 will result. If roll 38 of FIG. 7 is used however then heat seals 77 transverse to the rows of corrugations of core 23 will result as shown in FIG. 10. The thickness of face sheets 25 and 28 are in the range of about 0.004 to 0.080 inches and 0.004 to 0.050 inches, respectively. A variety of corrugation profiles such as A, B, and C-flutes can be utilized for core 23.

FIG. 11 is an alternative series of machine elements for station 14, comprising one or more rolls 81 of heating means 13 adapted to engage corrugations 87 of core 23, and a chill roll 89 with projections 91 adapted to engage corrugations 87 of core 23. Rolls 81 are similar in operation to conveyor 30, and chill roll 89 is similar in operation to chill roll 40. The distance between rolls 81 and 89 is set to ensure that a minimum amount of heat exchange occurs therebetween and that the plastic has not solidified before pressure from chill roll 89 has been applied. Rolls 81 and 89 are coupled by a means (not shown) to move at a synchronized rate both with respect to one another and conveyor 32 (not shown).

Figure 12:
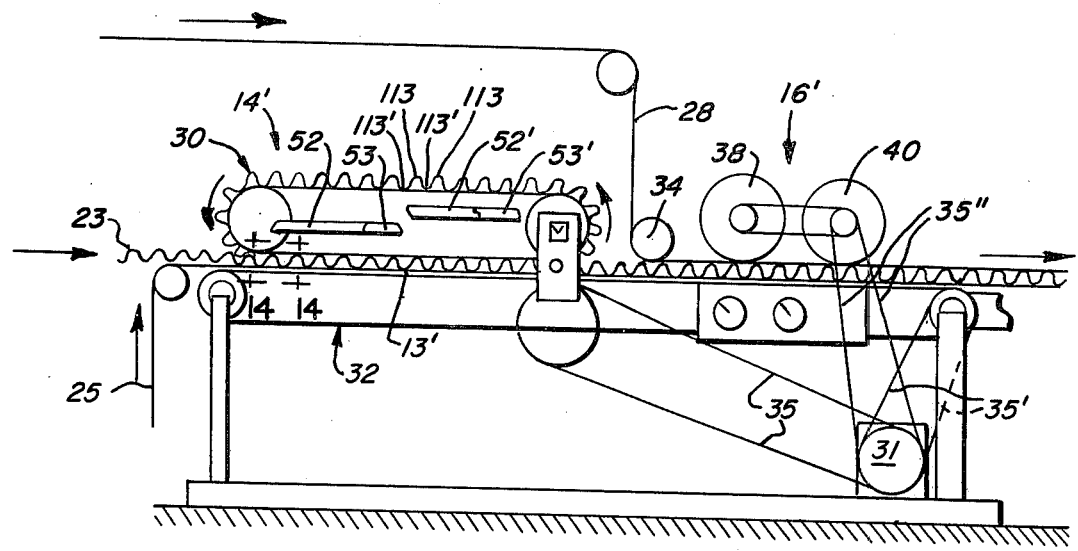
FIG. 12 is a schematic of a modified first heat sealing station of FIG. 1 shown together with a second heat sealing station.
Figure 13:
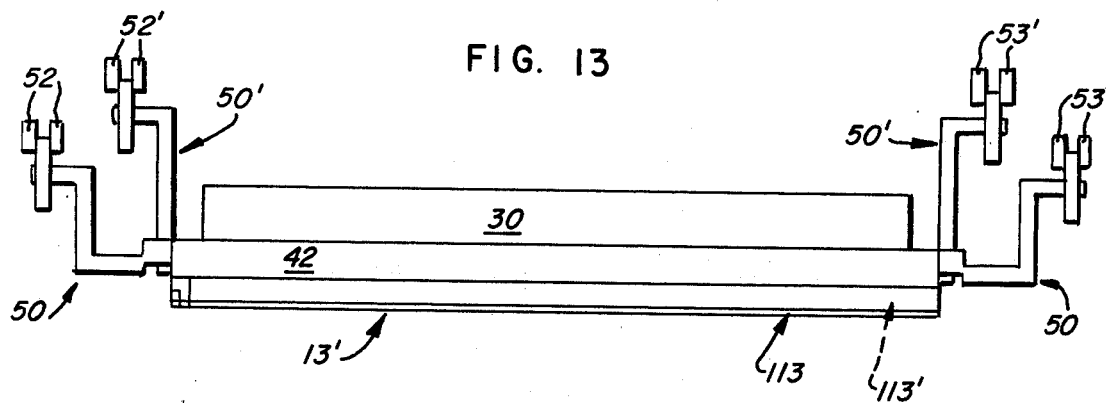
FIG. 13 is an enlarged cross-sectional view of a modified heating means in the first heat sealing station of FIG. 12.

In FIG. 12, a schematic embodiment of an alternate form of the first continuous heat sealing station 14 of FIG. 1 is disclosed. The alternate form is heat sealing station 14' which comprises: a first conveyor 30 of heaters 13', a second conveyor 32, bus bars 52, 53, 52' and 53', and a common drive 31 with belts 35, 35' and 35". Heaters 13' comprise two substantially alternating and interrelated heaters 113 and 113'. Heater 113' is like a shoulder for heater 113 so that heaters 113 and 113' are at two different distances from conveyor 32. Said first conveyor 30 of heaters 13' is spaced from said second conveyor 32 so as to create a nip between heaters 113 and conveyor 32. Some of the legs 50 and 50' of heaters 113 and 113', respectively, of conveyor 30 are in pressure contact with bus bars 52, 53, 52' and 53' as shown in FIG. 13. Bus bars 52, 52', 53 and 53' are in contact with a voltage source (not shown).

Figure 14:
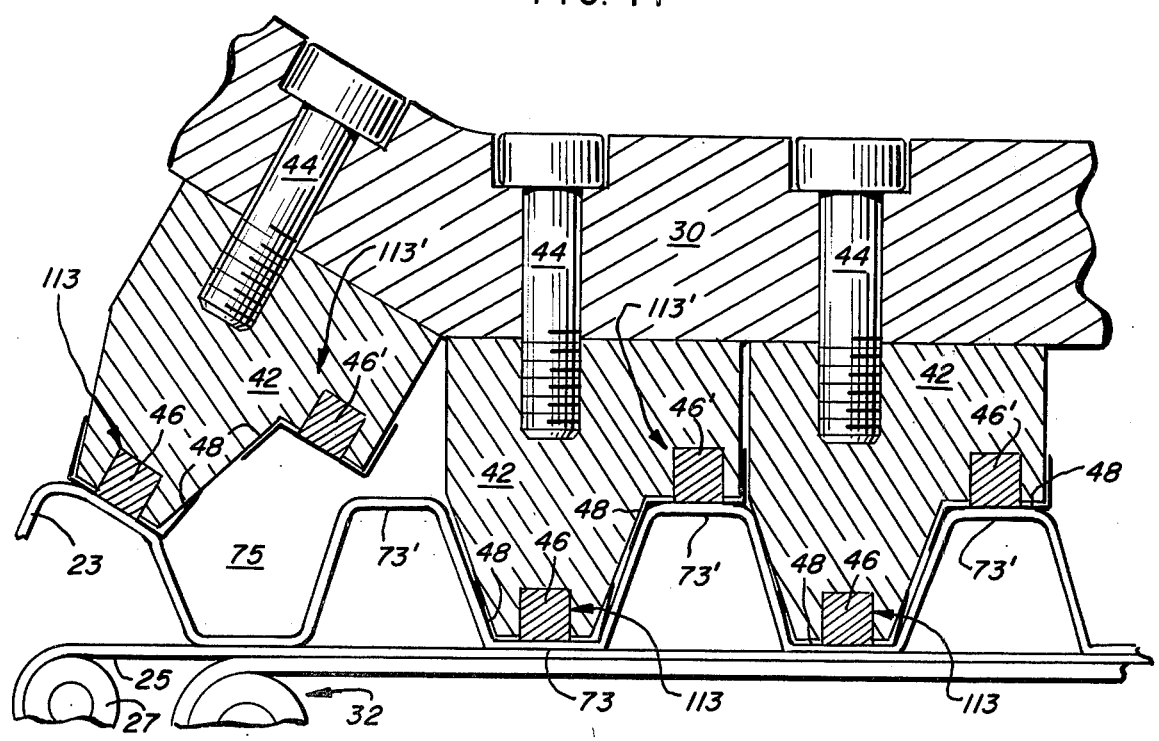
FIG. 14 is an enlarged segmented cross-sectional view of a modified heating means along 14—14 of FIG. 12.

To understand the operation of heating sealing station 14', the step by step process by which a corrugated plasticboard is formed therein is described hereinafter. A corrugated core formed in station 12 is engaged by heaters 113 and 113' as shown in FIG. 14. Heaters 113 engage corrugations of core 23 from within in space 75. A first face material 25 is brought into pressure contact with apexes 73 of corrugations on a first side of said corrugated medium 23 in the nip created between said heaters 113 and conveyor 32. Said heaters 113 and conveyor 32 act as a means for conveying material 25 and core 23 both in uniform motion and in pressure contact with one another. The speed of conveyors 30 and 32 are synchronized by means of belts 35 and 35' connected to a infinitely variable common drive 31. Heaters 113 and 113' are in contact with bus bars 52 and 53, and 52' and 53', respectively. In addition to engaging corrugations of core material 23, a constant voltage from a source (not shown) induces current to flow through a resistance element 46 (see FIG. 14) of heaters 113 thereby causing the heating of the inside wall of apexes 73. The heat generated at the upper inside wall of apex 73 passes through core material 23 and into the portion of a first face material 25. Since bus bars 52 and 53 begin at the up stream end and do not extend the complete length of conveyor 30, there is a period of cooling which occurs while heaters 113 are not in contact with bus bars 52 and 53. Since pressure contact is maintained throughout the length of conveyor 30 between the core 23 and first face material 25, a heat seal can be produced therebetween. Also since bus bars 52' and 53' do not extend through the whole length of conveyor 30, and begin about where bus bars 52 and 53 end, heaters 113' can begin to heat at about the time that heaters 113 begin to cool. Heaters 113' heat apexes 73' from outside of core 23. It is to be noted that the configuration of the heaters 113 and 113' is such that the corrugations are heated at controlled positions determined by the interaction of core material 23 with heaters 113 and 113'.

The heat imparted from heaters 113' makes apexes 73' molten and they remain in said molten or unsolidified state until after face material 28 is brought into pressure contact therewith in station 16'. Station 16' comprises orienting roll 34, and temperature controllable rolls 38 and 40, and a portion of conveyor 32. While at a melt fusion temperature apexes on a second side of corrugated core 23 are brought into contact with a second face material 28 in the nip between temperature controllable rolls 38 and 40 and conveyor 32. Addtional heating can be imparted to the material by temperature controllable roll 38 by heat transfer therefrom through a second side of said second face material 28 toward a first side of said second face material 28 which is in pressure contact with apexes 73'. It is to be noted that the apexes 73' on a second side of core 23 have been heated by heaters 113' as shown in FIG. 14. Temperature controllable roll 40 is a cooling roll which cools and solidifies the second face material 28 in pressure contact with the apexes 73', consequently forming a bond therebetween.

In the embodiment disclosed in FIG. 12, the heating of core material 23 is in two phases and is arranged so that the apexes on the first side are heated initially and then permitted to cool while the apexes on the second side of core 23 are heated during some of the process of cooling of the apexes on the first side of core 23. Since the heating of the apexes on the second side is begun during some of the time that the apexes on the first side of core 23 are cooling this increases the production speeds possible. It also permits the lamination of a flat second face material 28. Since there is some heating in station 14', the need for additional heating in station 16' by temperature controllable rolls 38 or other means is lessened and in some instances can be eliminated.

In FIG. 13, an enlarged heater 13' comprising heaters 113 and 113' is disclosed comprising contact legs 50 and 50', bus bars 52, 52', 53, and 53', conveyor belt 30, release liner 48, and resistance elements 46 and 46'.

In FIG. 14, an enlarged and segmented side elevation view of a closed loop 30 of heaters 13' is shown engaging core material 23. First face material 25 is oriented in the nip created between heaters 113 and second conveyor 32 and is in pressure contact with corrugations 73 on a first side of core 23. Heaters 113' are in contact with an outside surface of corrugations 73' on a second side of core 23.

Figure 15:
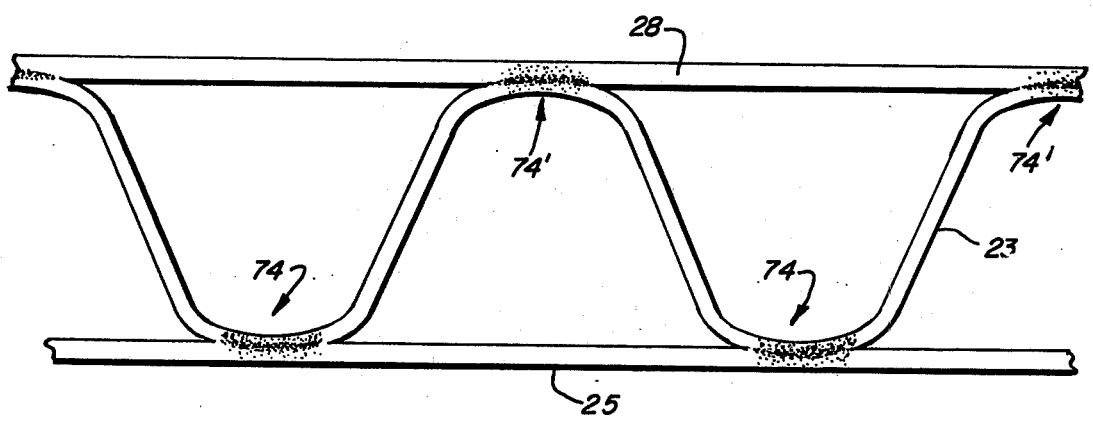
FIG. 15 is an enlarged side elevation view of a corrugated plasticboard made by the machine of FIG. 12.

In FIG. 15, there is disclosed an enlarged side elevation view of a two-faced corrugated plasticboard which can be made by the machine of FIG. 12. Heat seals 74 between corrugation on a first side of core 23 and first face material 25 are made in station 14' and heat seals 74' between corrugations on a second side of core 23 and second face material 28 is made in station 16'. First and second face materials 25 and 28 have thicknesses in the range of about 0.004 to about 0.080 inches and core 23 has a thickness in the range of about 0.004 to about 0.025 inches. It is to be noted that there can be flat exterior faces on both sides of the corrugated plasticboard formed by the machine disclosed in FIG. 12.

Variation on the specific embodiments disclosed will be apparent to persons of average skill in the art and are intended to be within the scope of this invention.

EXAMPLE

A polyvinyl chloride corrugated plasticboard having face sheets of 0.018 inches thick and 4 feet wide with a C-flute core of 9/64 of an inch in height and 42 flutes/linear foot and 0.018 inch thick is made on the machine of FIG. 1 wherein the machine is set as follows:

Conveyor 30:
  length: 6 feet
  speed: 80 ft./minute
Bus bars 52 & 53:
  length: 4 feet
  heater resistance: 5.2 ohms
  voltage: 65 volts
Pressure created on plastic:
  first nip: 35 psi
  second and third nips: 9 psi
Temperature rolls:
  rolls 38  (1): 250° F
          (2): 500° F
  center-to-center distance between:
    rolls 38(1)–38(2)    roll 38'(2)–40
    6¼ inches                12 inches
  diameters of 38   (1): 6 inches
                    (2): 6 inches
  vortex tube conditions:
    input: 80–110 psi
    output: 30–40 cfm
    output temperature: 0–20° F
Equilibrium Temperature of Roll 40:   30–50° F
diameter of roll 40:   6 inches
revolutions/minute:
  roll 38  (1): 50–51
          (2): 50–51
  roll 40:  50–51

The invention which is claimed is:

1. A process for manufacturing a single faced corrugated plasticboard comprising:
   (1) forming a corrugated web,
   (2) heating selectively by means of resistive heating to a heat fusion temperature apexes from within corrugations of said corrugated web,
   (3) solidifying under pressure a first web in contact with said apexes; wherein said first web and said corrugated web are in continuous motion throughout steps (1) to (3).

2. The process of claim 1, wherein said heat fusion temperature is in the range of about 300°–625° F. for high density polyethylene, 325°–625° F. for polypropylene, and 400°–650° F. for polyvinyl chloride, and the plastic at the interface is solidified from said temperatures while under a pressure in the range of about 5–100 psi.

3. A process for manufacturing a two faced corrugated plasticboard comprising:

(1) heating selectively by means of resistive heating apexes from within corrugations of a first side of a corrugated web to a melt fushion temperature,
(2) solidifying under pressure said apexes on a first side of said corrugated web in contact with a first web melt fusible thereto,
(3) heating a second web,
(4) contacting said second web and apexes on a second side of said corrugated web, and
(5) solidifying under pressure said second web in contact with said corrugated web; wherein all webs are in continuous motion during steps (1) to (5).

4. The process of claim 3, wherein the heating of step (1) substantially occurs while apexes on a first side of said corrugated web are in pressure contact with said first web.

5. The process of claim 3, wherein the heating of step (3) is substantially occurring while said second web is in pressure contact with said apexes on a second side of said corrugated web.

6. A process for manufacturing a two faced corrugated plasticboard comprising:
(1) contacting a first web with a first set of apexes heat fusible therewith which apexes are on a first side of a corrugated web;
(2) heating selectively said first set of apexes to a melt fushion temperature from within corrugations;
(3) solidifying said first set of apexes in pressure contact with said first web, whereby a bond is formed therebetween;
(4) heating selectively a second set of apexes on a second side of said corrugated web from without to a melt fusion temperature, wherein the step of heating said second set of apexes can be in part simultaneous with said step (3) of solidifying;
(5) contacting under pressure said second set of apexes with a first side of a second web heat fusible thereto; and
(6) solidifying said second set of apexes in pressure contact with said second web, whereby a bond is formed therebetween.

7. The method of claim 6, wherein there is an additional step between steps (4) and (5) comprising the step of heating said second web prior to contacting under pressure said second set of apexes therewith.

8. The method of claim 6, wherein there is an additional step between steps (5) and (6) comprising the step of heating said second web.

9. The process of claim 6, wherein the selective heating of (2) and (4) are by means of resistive heating.

* * * * *

UNITED STATES PATENT OFFICE
CERTIFICATE OF CORRECTION

Patent No. 4,132,581   Dated  January 2, 1979

Inventor(s) Henry D. Swartz

It is certified that error appears in the above-identified patent and that said Letters Patent are hereby corrected as shown below:

Patent

| Col. | Line | |
|---|---|---|
| 2 | 27-28 | "periodicaly" should read -- periodically -- |
| 6 | 54 | "34"" should read -- 35" -- |
| 6 | 62 | "chrome plates" should read -- chrome plated -- |
| 7 | 51 | "stations 12." should read -- station 12. -- |
| 8 | 23 | "exists" should read -- exits -- |
| 12 | 22 | "linear" should read -- lineal -- |
| 13 | 3 | "fushion" should read -- fusion -- |
| 14 | 2 | "fushion" should read -- fusion -- |

Signed and Sealed this

Third Day of July 1979

[SEAL]

Attest:

LUTRELLE F. PARKER

*Attesting Officer*   *Acting Commissioner of Patents and Trademarks*